US012668247B2

(12) United States Patent
Eriksson et al.

(10) Patent No.: US 12,668,247 B2
(45) Date of Patent: Jun. 30, 2026

(54) MODEL-BASED ROAD ESTIMATION

(71) Applicant: ZENSEACT AB, Gothenburg (SE)

(72) Inventors: Ossian Eriksson, Linköping (SE); Lars Hammarstrand, Mölnlycke (SE); Yuxuan Xia, Gothenburg (SE); Sachin Madhusudhana, Gothenburg (SE); Valentin Kovbas, Hisings Backa (SE); Junsheng Fu, Nödinge (SE)

(73) Assignee: ZENSEACT AB, Gothenburg (SE)

( * ) Notice: Subject to any disclaimer, the term of this patent is extended or adjusted under 35 U.S.C. 154(b) by 0 days.

(21) Appl. No.: 18/739,846

(22) Filed: Jun. 11, 2024

(65) Prior Publication Data

US 2024/0425056 A1 Dec. 26, 2024

(30) Foreign Application Priority Data

Jun. 13, 2023 (EP) ..................................... 23178905

(51) Int. Cl.
B60W 40/00 (2006.01)
B60W 40/06 (2012.01)
(Continued)

(52) U.S. Cl.
CPC ........ B60W 40/06 (2013.01); B60W 60/0011 (2020.02); G06V 10/893 (2022.01);
(Continued)

(58) Field of Classification Search
CPC ............. B60W 40/06; B60W 60/0011; B60W 2552/53; B60W 2420/403;
(Continued)

(56) References Cited

U.S. PATENT DOCUMENTS 5,680,313 A * 10/1997 Whittaker .......... B60K 31/0008
                                                      382/104
6,131,072 A * 10/2000 Holden ............ G01N 27/44721
                                                      204/461
(Continued)

FOREIGN PATENT DOCUMENTS

CN          112884837 A * 6/2021 ............... G06T 7/73
CN          113739811 A * 12/2021 ......... G01C 21/3484
(Continued)

OTHER PUBLICATIONS

CN-112884837-A machine translation (Year: 2021).*
(Continued)

*Primary Examiner* — Angelina M Shudy
(74) *Attorney, Agent, or Firm* — Sage Patent Group

(57) ABSTRACT

A computer-implemented method for estimating a road geometry of a road upon which a vehicle is traveling and related aspects are disclosed. The disclosed embodiments provide a model-based technique for estimating a road model having an arbitrary number of lanes on a road as well as any entrance lanes (i.e. on-ramp or slip roads) and exit lanes (i.e. off ramps or off-slip roads). In more detail, the herein disclosed embodiments utilize a Bayesian approach to multi-lane tracking in various traffic scenarios, such as e.g. highway scenarios. The employed model-based algorithm estimates the lane center curves of multi-lane roads based on vehicle motion data (e.g. speed, angular velocity) and perception data (e.g. camera output, lidar output, radar output, etc.) that includes detected road features (e.g. lane markers, road edges, road barriers, guard rails, road markers, etc.) or other objects (e.g. other road users).

12 Claims, 4 Drawing Sheets

(51) Int. Cl.
*B60W 60/00* (2020.01)
*G06V 10/88* (2022.01)
*G06V 20/56* (2022.01)

(52) U.S. Cl.
CPC ..... *G06V 20/588* (2022.01); *B60W 2420/403* (2013.01); *B60W 2520/10* (2013.01); *B60W 2552/53* (2020.02)

(58) Field of Classification Search
CPC ............ B60W 2520/10; G06V 10/893; G06V 20/588; G01C 21/00; G05D 1/00; G08G 1/00
See application file for complete search history.

(56) References Cited

U.S. PATENT DOCUMENTS

| | | | | |
|---|---|---|---|---|
| 6,393,362 B1* | 5/2002 | Burns | ................. | G05D 1/0278 |
| | | | | 701/119 |
| 6,718,259 B1* | 4/2004 | Khosla | .................. | G01C 21/26 |
| | | | | 701/96 |
| 6,850,628 B2* | 2/2005 | Shirato | ............... | G06V 10/757 |
| | | | | 701/28 |
| 10,657,390 B2* | 5/2020 | Mei | ......................... | G06N 3/08 |
| 11,112,259 B2* | 9/2021 | Nashed | ............. | B60W 60/0011 |
| 11,200,432 B2* | 12/2021 | Hyun | ....................... | G06T 7/11 |
| 11,248,925 B2* | 2/2022 | Lee | ...................... | G06V 20/20 |
| 12,030,502 B2* | 7/2024 | Malach | .................... | G06T 7/70 |
| 12,403,933 B2* | 9/2025 | Beauvisage | ........... | G01C 21/30 |
| 2002/0042668 A1* | 4/2002 | Shirato | ............... | G06V 20/588 |
| | | | | 701/1 |
| 2002/0042676 A1* | 4/2002 | Furusho | .............. | G05D 1/0246 |
| | | | | 701/300 |
| 2003/0001732 A1* | 1/2003 | Furusho | .............. | G05D 1/0246 |
| | | | | 348/148 |
| 2003/0100992 A1* | 5/2003 | Khosla | .................. | G01S 7/411 |
| | | | | 701/514 |
| 2005/0093735 A1* | 5/2005 | Samukawa | .......... | G01S 7/4802 |
| | | | | 340/436 |
| 2005/0179580 A1* | 8/2005 | Cong | ................... | G01S 13/723 |
| | | | | 342/107 |
| 2008/0243378 A1* | 10/2008 | Zavoli | .................. | G01C 21/28 |
| | | | | 701/533 |
| 2010/0004903 A1* | 1/2010 | Fargas | ................... | G06T 17/05 |
| | | | | 342/357.29 |
| 2010/0057336 A1* | 3/2010 | Levine | ............ | G08G 1/096816 |
| | | | | 701/532 |
| 2010/0253540 A1* | 10/2010 | Seder | ..................... | G08G 1/165 |
| | | | | 348/148 |
| 2010/0253594 A1* | 10/2010 | Szczerba | ............... | G08G 1/167 |
| | | | | 345/7 |
| 2010/0253602 A1* | 10/2010 | Szczerba | ............. | G06V 20/588 |
| | | | | 345/8 |
| 2012/0185167 A1* | 7/2012 | Higuchi | .............. | G06V 20/588 |
| | | | | 382/104 |
| 2012/0271483 A1* | 10/2012 | Samukawa | .......... | B60W 30/16 |
| | | | | 701/1 |
| 2013/0177211 A1* | 7/2013 | Watanabe | ............ | G06V 20/588 |
| | | | | 382/103 |
| 2013/0261870 A1* | 10/2013 | Halder | ................ | G05D 1/0278 |
| | | | | 701/25 |
| 2013/0282357 A1* | 10/2013 | Rubin | .................. | G08G 1/0969 |
| | | | | 703/22 |
| 2015/0165972 A1* | 6/2015 | Takemae | ................ | G06V 20/58 |
| | | | | 348/148 |
| 2015/0165973 A1* | 6/2015 | Takemae | ............. | G06V 20/588 |
| | | | | 348/148 |
| 2015/0325127 A1* | 11/2015 | Pandita | ................. | G08G 1/167 |
| | | | | 701/523 |
| 2016/0180177 A1* | 6/2016 | Nguyen | ................ | G06V 10/42 |
| | | | | 382/104 |
| 2016/0335507 A1* | 11/2016 | Chen | .................... | G06V 20/588 |

| | | | | |
|---|---|---|---|---|
| 2016/0350603 A1* | 12/2016 | Suddamalla | .............. | G06T 7/13 |
| 2017/0243485 A1* | 8/2017 | Rubin | ..................... | H04W 4/46 |
| 2017/0248960 A1* | 8/2017 | Shashua | ................ | G08G 1/167 |
| 2017/0249518 A1* | 8/2017 | Babala | .................. | G08G 1/167 |
| 2018/0015923 A1* | 1/2018 | Kurumisawa | .......... | G08G 1/166 |
| 2018/0024562 A1* | 1/2018 | Bellaiche | ............... | B60R 1/025 |
| | | | | 701/26 |
| 2018/0058870 A1* | 3/2018 | Gaebler | ................. | G08G 1/093 |
| 2018/0080775 A1* | 3/2018 | Loomis | ............... | G01C 21/165 |
| 2018/0165525 A1* | 6/2018 | Hamada | ................ | G01C 21/30 |
| 2018/0225527 A1* | 8/2018 | He | ........................ | G06V 20/588 |
| 2018/0304891 A1* | 10/2018 | Heidenreich | .......... | G01C 21/30 |
| 2018/0357890 A1* | 12/2018 | Fowe | ................... | G08G 1/0133 |
| 2018/0373941 A1* | 12/2018 | Kwant | ................ | G08G 1/0145 |
| 2019/0016339 A1* | 1/2019 | Ishioka | ........... | B60W 30/0956 |
| 2019/0066507 A1* | 2/2019 | Morita | ................. | H04W 84/00 |
| 2019/0120632 A1* | 4/2019 | Daikoku | ........... | G01C 21/3658 |
| 2019/0258251 A1* | 8/2019 | Ditty | .................... | G05D 1/0088 |
| 2019/0263402 A1* | 8/2019 | Tokimasa | ................. | B60T 7/12 |
| 2019/0279504 A1* | 9/2019 | Geisler | ............... | G08G 1/0112 |
| 2019/0346572 A1* | 11/2019 | Fowe | ..................... | G01S 19/06 |
| 2020/0117921 A1* | 4/2020 | Okada | ............... | G06V 20/588 |
| 2020/0132476 A1* | 4/2020 | Roeth | ............... | G01C 21/3819 |
| 2020/0141750 A1* | 5/2020 | Hardy | ............. | G01C 21/3658 |
| 2020/0167934 A1* | 5/2020 | Bacchus | ................ | G06T 7/246 |
| 2020/0182631 A1* | 6/2020 | Yang | ................. | G06F 16/2379 |
| 2020/0210769 A1* | 7/2020 | Hou | ..................... | G06F 18/211 |
| 2020/0249038 A1* | 8/2020 | Nashed | ................. | G06F 18/295 |
| 2020/0250440 A1* | 8/2020 | Campos | .................. | G06N 3/04 |
| 2020/0272835 A1* | 8/2020 | Cheng | ................. | B60W 50/14 |
| 2020/0285863 A1* | 9/2020 | Sadjadi | ............... | G08G 1/167 |
| 2021/0041263 A1* | 2/2021 | Hirate | ............... | G01C 21/3602 |
| 2021/0058608 A1* | 2/2021 | Jung | ............... | G01C 21/3822 |
| 2021/0064888 A1* | 3/2021 | Hardå | .................. | B60W 30/09 |
| 2021/0070320 A1* | 3/2021 | Nagaraja | .......... | B60W 50/0098 |
| 2021/0197828 A1* | 7/2021 | Kumano | ............... | G06V 20/58 |
| 2021/0256274 A1* | 8/2021 | Kumano | ............ | G06V 20/588 |
| 2021/0264790 A1* | 8/2021 | Ganesan | ............... | G08G 1/166 |
| 2021/0302187 A1* | 9/2021 | Nagavalli | .......... | G01C 21/3407 |
| 2021/0323557 A1* | 10/2021 | Yen | ..................... | G06V 10/56 |
| 2021/0331671 A1* | 10/2021 | Kumano | ............. | B60W 30/12 |
| 2021/0409897 A1* | 12/2021 | Liu | ..................... | H04W 4/029 |
| 2022/0032957 A1* | 2/2022 | Wulfe | ............... | G01C 21/3407 |
| 2022/0101023 A1* | 3/2022 | Sarfraz | ............... | G05D 1/0088 |
| 2022/0111847 A1* | 4/2022 | Jung | ................ | B60W 30/0956 |
| 2022/0121861 A1* | 4/2022 | Mugnai | ................. | G06T 11/203 |
| 2022/0126831 A1* | 4/2022 | Foil | ...................... | G01S 13/723 |
| 2022/0135078 A1* | 5/2022 | Refaat | .................... | G06N 20/00 |
| | | | | 701/25 |
| 2022/0198198 A1* | 6/2022 | Marcotte | ............ | G01C 21/3822 |
| 2022/0292847 A1* | 9/2022 | Kibayashi | .......... | G08G 1/09626 |
| 2022/0292849 A1* | 9/2022 | Zhou | ........................ | G08G 1/04 |
| 2022/0355864 A1* | 11/2022 | Dalzell | ................ | B62D 15/025 |
| 2023/0009269 A1* | 1/2023 | Prasad | .................. | B60W 30/12 |
| 2023/0032741 A1* | 2/2023 | Zhou | .............. | B60W 30/18163 |
| 2023/0034574 A1* | 2/2023 | Xie | ........................ | G01C 21/26 |
| 2023/0082106 A1* | 3/2023 | Malson | .......... | B60W 30/18163 |
| | | | | 701/25 |
| 2023/0339394 A1* | 10/2023 | Haynes | ................. | G08G 1/166 |
| 2023/0368672 A1* | 11/2023 | Sommer | ............... | G08G 1/052 |
| 2023/0408278 A1* | 12/2023 | Zou | ..................... | G01C 21/3492 |
| 2023/0419688 A1* | 12/2023 | Saggu | ................. | G06V 10/764 |
| 2024/0185617 A1* | 6/2024 | Brems | .................. | G06V 20/70 |
| 2024/0317222 A1* | 9/2024 | Kangutkar | ............. | G06V 20/56 |
| 2024/0328793 A1* | 10/2024 | Fu | ......................... | G01C 21/30 |
| 2024/0328822 A1* | 10/2024 | Fu | ..................... | G01C 21/3889 |
| 2024/0344832 A1* | 10/2024 | Xia | ......................... | G01C 21/32 |
| 2024/0409125 A1* | 12/2024 | Taylor | .................. | B60W 30/12 |
| 2024/0416961 A1* | 12/2024 | Du | .......................... | G06F 30/20 |
| 2025/0044118 A1* | 2/2025 | Cui | ..................... | G06V 10/774 |
| 2025/0103883 A1* | 3/2025 | Guersun | ............. | G06F 16/9024 |
| 2025/0137809 A1* | 5/2025 | Kaku | .................. | G06V 20/588 |

(56)                      References Cited

U.S. PATENT DOCUMENTS

2025/0333068 A1* 10/2025 Fatemi Dezfouli ..........................
                                                    B60W 50/029
2025/0378569 A1* 12/2025 Karlsson ................... G06T 7/70

FOREIGN PATENT DOCUMENTS

| | | | | |
|---|---|---|---|---|
| CN | 114719840 A | * | 7/2022 | .......... B60W 60/001 |
| DE | 102022212897 A1 | * | 6/2024 | ............. G01S 13/86 |
| WO | WO-2022228459 A1 | * | 11/2022 | ............ B60W 40/00 |

OTHER PUBLICATIONS

CN-113739811-A machine translation (Year: 2021).*
CN-114719840-A machine translation (Year: 2022).*
DE-102022212897-A1 machine translation (Year: 2024).*
Haykin, Simon. Kalman filtering and neural networks. John Wiley & Sons, 2004. (Year: 2004).*
Suttorp, Thorsten, and T. Bucher. "Learning of kalman filter parameters for lane detection." 2006 IEEE Intelligent Vehicles Symposium. IEEE, 2006. (Year: 2006).*
WO-2022228459-A1 machine translation (Year: 2022).*
Extended European Search Report mailed Nov. 15, 2023 for European Patent Application No. 23178905.8, 6 pages.

* cited by examiner

MODEL-BASED ROAD ESTIMATION

CROSS-REFERENCE TO RELATED APPLICATIONS

The present application for patent claims priority to European Patent Office Application Ser. No. 23178905.8, entitled "MODEL-BASED ROAD ESTIMATION", filed on Jun. 13, 2023, assigned to the assignee hereof, and expressly incorporated herein by reference.

TECHNICAL FIELD

The disclosed technology relates to methods, apparatuses and related aspects for estimating a road model for a vehicle traveling on a road. In particular, but not exclusively the disclosed technology relates to a model-based algorithm to estimate center curves of a multi-lane road as well as on-ramps and off-ramps to and from the multi-lane road.

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC) collision avoidance system, forward collision warning, etc.— are electronic systems that may aid a vehicle driver while driving. Today, there is ongoing research and development within a number of technical areas associated to both the ADAS and the Autonomous Driving (AD) field. ADAS and AD will herein be referred to under the common term Automated Driving System (ADS) corresponding to all of the different levels of automation as for example defined by the SAE J3016 levels (1-5) of driving automation, and in particular for level 3, 4 and 5.

As computer hardware in vehicles continue to progress, it allows for an increasing amount of effort to be put into the development of Automated Driving Systems, and many active safety systems such as ACCs and Lane Support Systems (LSSs) are reliant on having some knowledge of the road surrounding the vehicle. Thus, increasing the accuracy and redundancy in road estimation systems may therefore be crucial for improving driver safety and comfort.

SUMMARY

The herein disclosed technology seeks to mitigate, alleviate or eliminate one or more of the above-identified deficiencies and disadvantages in the prior art to address various problems relating to performance in complex environments and redundancy.

Various aspects and embodiments of the disclosed invention are defined below and in the accompanying independent and dependent claims.

A first aspect of the disclosed technology comprises a computer-implemented method for estimating a road geometry of a road upon which a vehicle is traveling, where the road geometry is described by a filter state that is tracked by a tracking filter. The filter state comprises a plurality of road model hypotheses, wherein each road model hypothesis is associated with a probability and comprises a parametrization of the road describing a geometry of one or more lanes of the road and where each lane of each road model hypothesis is associated with a probability of existence. The method comprises, for each time step out of a plurality of consecutive time steps, predicting a filter state by determining a probability density of each road model hypothesis based on vehicle motion data and a prior filter state determined at a preceding time step. Further, the method comprises associating road features obtained from perception data derived from an output of one or more vehicle-mounted sensors with the parametrization of the road of each road model hypothesis of the predicted filter state. The method further comprises determining an existence probability for each lane of each road model hypothesis based on a prior existence probability for each corresponding lane determined at the preceding time step and the road feature association, and determining a probability of each road model hypothesis of the plurality of road model hypotheses based on the prior filter state determined at the preceding time step and the determined existence probability of each lane of that road model hypothesis. Furthermore, the method comprises selecting the road model hypothesis associated with the highest probability based on the determined probability of each road model hypothesis, and outputting a road model based on the parametrization of the road of the selected road model hypothesis.

A second aspect of the disclosed technology comprises a computer program product comprising instructions which, when the program is executed by a computing device of a vehicle, causes the computing device to carry out the method according to any one of the embodiments of the first aspect disclosed herein. With this aspect of the disclosed technology, similar advantages and preferred features are present as in the other aspects.

A third aspect of the disclosed technology comprises a (non-transitory) computer-readable storage medium comprising instructions which, when executed by a computing device of a vehicle, causes the computing device to carry out the method according to any one of the embodiments of the first aspect disclosed herein. With this aspect of the disclosed technology, similar advantages and preferred features are present as in the other aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

A fourth aspect of the disclosed technology comprises an apparatus for estimating a road geometry of a road upon which a vehicle is traveling, where the road geometry is described by a filter state that is tracked by a tracking filter. The filter state comprising a plurality of road model hypotheses, where each road model hypothesis is associated with a probability and comprises a parametrization of the road describing a geometry of one or more lanes of the road and wherein each lane of each road model hypothesis is associated with a probability of existence. The apparatus comprises control circuitry configured to, for each time step out of a plurality of consecutive time steps, predict a filter state by determining a probability of each road model hypothesis based on vehicle motion data and a prior filter state determined at a preceding time step. The control circuitry is further configured to associate road features obtained from perception data derived from an output of one or more vehicle-mounted sensors with the parametrization of the road of each road model hypothesis of the predicted filter state. Moreover, the control circuitry is configured to determine an existence probability for each lane of each road model hypothesis based on a prior existence probability for each corresponding lane determined at the preceding time step and the road feature association, and determine a probability of each road model hypothesis of the plurality of road model hypotheses based on the prior filter state determined at the preceding time step and the determined existence probability of each lane of that road model hypothesis. The control circuitry is further configured to select the road model hypothesis associated with the highest probability based on the determined probability of each road model hypothesis, and output a road model based on the parametrization of the road of the selected road model hypothesis. With this aspect of the disclosed technology, similar advantages and preferred features are present as in the other aspects.

A fifth aspect of the disclosed technology comprises a vehicle comprising an apparatus according to any one of the embodiments disclosed herein. With this aspect of the disclosed technology, similar advantages and preferred features are present as in the other aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which:

FIG. 3b is a schematic illustration of a bird's eye view of the 3D lane marking points which were detected re-projected into the camera image of FIG. 3a.

DETAILED DESCRIPTION

Figures 1, 2:
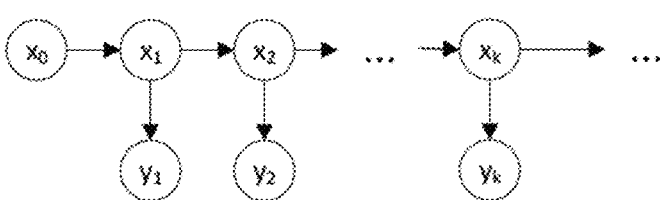
FIG. 1 is a schematic illustration of a Bayesian network representation of a state space model.
FIG. 2 is a set of schematic illustration of a road parametrization in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general-purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

The herein disclosed technology provides a model-based technique for estimating a road model having an arbitrary number of lanes on a road as well as any entrance lanes (i.e. on-ramp or slip roads) and exit lanes (i.e. off ramps or off-slip roads). In more detail, the herein disclosed embodiments utilize a Bayesian approach to multi-lane tracking in various traffic scenarios, such as e.g. highway scenarios. The employed model-based algorithm estimates the lane center curves of multi-lane roads based on vehicle motion data (e.g. speed, angular velocity) and perception data (e.g. camera output, lidar output, radar output, etc.) that comprises detected road features (e.g. lane markers, road edges, road barriers, guard rails, road markers, etc.) or other objects (e.g. other road users).

In particular, in accordance with some embodiments, the herein disclosed technology utilizes a road parametrization that supports describing any number of lanes, on-ramps, and off-ramps and the road parametrization is suitable for tracking with a Bayesian filter. In particular, embodiments herein use a multiple hypothesis coupled multi-object tracking filter for the parametrization of the road. Multiple hypotheses are used to deal with data association from detection of road features and coupling lanes are used to model parallel lanes. Furthermore, some embodiments deal with object spawning (i.e. lane spawning) and death giving each lane within each hypothesis a probability of existence.

In the context of the present disclosure, the term "road model" refers to a digital representation or virtual model of the road environment. It is considered to be a crucial component used by autonomous vehicles to perceive and understand the surrounding road conditions. The road model typically includes various elements such as the geometry of the road and lane markings, and may further include traffic signs, traffic lights, obstacles, and other relevant features. The road model serves as a reference for the automated driving system to make decisions and navigate the vehicle safely. It allows the system to determine the vehicle's position, plan its trajectory, detect and track objects, interpret traffic signs and signals, and anticipate potential hazards or obstacles on the road. By continuously updating and analyzing the road model in real-time, the ADS can adapt to changing road conditions, make appropriate driving decisions, and ensure the safety and efficiency of the vehicle's operation.

In the following, relevant background theory and other details are presented in order to facilitate the understanding of the herein disclosed embodiments.

There are multiple interpretations of the concept of probability, of which Bayesian probability is one. In the framework, all events have a prior probability of occurring which allows for expressing the probability of an event even when none or finitely many experiments have been done to test the ratio between positive and negative outcomes. Crucial to Bayesian probability is Bayes theorem $$p(A|B)p(b) = p(B|A)p(A) \tag{1.1}$$

which may be derived from $p(A \cup B) = p(A|B)p(B)$.

For the purpose of state estimation, we assume our control system is described by a discrete state space model. In each time step k we typically represent the state estimate by a random variable $x_k$ and receive measurements also in the form of a random variable $y_k$. A Bayesian network representation of a state space model is shown in FIG. 1. This figure visualizes some conditional independencies between the random variables which follows from the state space representation, specifically $$p(x_k|x_{k-1}, y_{1:k-1}) = p(x_k|x_{k-1}) \tag{1.2}$$

and $$p(y_k|x_k, y_{1:k-1}) = p(y_k|x_k) \tag{1.3}$$

The goal of the Bayesian state estimation is to express the posterior state density $p(x_k|y_{1:k})$ given measurements from time 1 to k and a prior $p(x_{k-1}|y_{1:k-1})$. However, to find $p(x_k|y_{1:k})$ one first seeks an expression for $p(x_k|y_{1:k-1})$. Using equation (1.2) and the law of total probability one arrives at what is known as the Chapman-Kolmogorov equation $$p(x_k|y_{1:k-1}) = \int p(x_k|x_{k-1})p(x_{k-1}|y_{1:k-1})dx_{k-1} \tag{1.4}$$

where one has deduced $p(x_k|x_{k-1},y_{1:k-1})=p(x_k|x_{k-1})$ from the Bayesian network of FIG. 1.

Further, equation (1.3) in combination with Bayes theorem, i.e. equation (1.1) gives $$p(x_k|y_{1:k}) = \frac{p(y_k|x_{k-1}, y_{1:k-1})p(x_k|y_{1:k-1})}{p(y_k|y_{1:k-1})} \propto p(y_k|x_k)p(x_k|y_{1:k-1}) \tag{1.5}$$

Here, $p(y_k|x_k)$ is known as the measurement likelihood. Since one is generally interested in the density with respect to xx one can view the denominator of equation (1.5) as a constant normalization factor and discard it. It can however later be recreated by enforcing that $p(x_k|y_{1:k})$ should integrate to one.

Thus, the basic building blocks of a generic Bayesian state estimator have been laid down. In time step k given a prior density $p(x_{k-1}|y_{1:k-1})$ one first performs what is known as the prediction step of the estimation by applying the Chapman-Kolmogorov equation (1.4) to obtain $p(x_k|y_{1:k-1})$. From a known expression of the measurement likelihood one next performs what is known as the update step by applying equation (2.5) to obtain $p(y_k|x_k)$. This process is then repeated recursively for time steps k+1, k+2, and so on. For the initial time step, an expression for the initial prior $p(x_0)$ needs to be provided.

The Kalman filter is a Bayesian state estimator specialized for linear and Gaussian systems. A linear Gaussian state space model is given by $$x_k = A_k x_{k-1} + B_k u_k + q_k \tag{1.6}$$

$$y_k = C_k x_k + D_k u_k + r_k \tag{1.7}$$

where $A_k$, $B_k$, $C_k$, $D_k$ are constant matrixes, $u_k$ is a control signal and $q_k \sim \mathcal{N}(0,Q_k)$, $r_k \sim \mathcal{N}(0,R_k)$, $x_0 \sim \mathcal{N}(\hat{x}_{0|0}, P_{0|0})$ are independent random vector variables. Equations (1.6) and (1.7) are known as the motion and measurement model, respectively, and $q_k$ and $r_k$ are known as the process noise and measurement noise, respectively.

It can be shown that the state estimates will also be Gaussian distributed for all time steps, i.e.

$$p(x_k|y_{1:k}) \sim \mathcal{N}(\hat{x}_{k|k}, P_{k|k}) \tag{1.8}$$

7

-continued $$p(x_k|y_{1:k-1}) \sim \mathcal{N}(\hat{x}_{k|k-1}, P_{k|k-1}) \qquad (1.9)$$

As such, the Kalman filter is a conjugate prior filter, meaning the prior and posterior densities are of the same family, Gaussian in this case. For linear and Gaussian systems, it can also be shown that the Bayesian state estimation equations specializes to
Prediction:

$$\hat{x}_{k|k-1} = A_k \hat{x}_{k-1|k-1} + B_k u_k \qquad (1.10a)$$

$$P_{k|k-1} = A_k P_{k-1|k-1} A_k^T + Q_k \qquad (1.10b)$$

Update:

$$\hat{y}_k = C_k \hat{x}_{k|k-1} + D_k u_k \qquad (1.10c)$$

$$S_k = C_k P_{k|k-1} C_k^T + R_k \qquad (1.10d)$$

$$K_k = P_{k|k-1} C_k^T S_k^{-1} \qquad (1.10e)$$

$$\hat{x}_{k|k} = \hat{x}_{k|k-1} + K_k(y_k - \hat{y}_k) \qquad (1.10f)$$

$$P_{k|k} = P_{k|k-1} - K_k C_k P_{k|k-1} \qquad (1.10g)$$

Here, $\hat{x}_{a|b}$ represents the estimate of x at time a given the observations up to and including time b≤a. Moreover equation (1.10a) is the predicted state estimate, equation (1.10b) is the predicted covariance estimate, equation (1.10c) is the innovation or measurement residual, equation (1.10d) is the innovation or residual covariance, equation (1.10e) is the Kalman gain, equation (1.10f) is the updated state estimate, equation (1.10g) is the updated covariance estimate.

The Extended Kalman Filter (EKF) is a variation of the Kalman filter adapted for nonlinear state space models given by $$x_k = f_k(x_{k-1}, u_k) + q_k \qquad (1.11)$$

$$y_k = h_k(x_k, u_k) + r_k \qquad (1.12)$$

The process and measurement noises $q_k$ and $r_k$ are as in the ordinary Kalman filter. In every time step the motion and measurement models are linearized around the mean of the prior. The ordinary Kalman filter equations are then applied to the linearization. This results in an approximate solution to the state estimation problem where all densities are assumed to be Gaussian. The full EKF equations are given as
Prediction:

$$\hat{x}_{k|k-1} = f_k(\hat{x}_{k-1|k-1}, u_k) \qquad (1.13a)$$

$$P_{k|k-1} = F_k P_{k-1|k-1} F_k^T + Q_k \qquad (1.13b)$$

Update:

$$\hat{y}_k = h_k(\hat{x}_{k|k-1}, u_k) \qquad (1.13c)$$

8

-continued $$S_k = H_k P_{k|k-1} H_k^T + R_k \qquad (1.13d)$$

$$K_k = P_{k|k-1} H_k^T S_k^{-1} \qquad (1.13e)$$

$$\hat{x}_{k|k} = \hat{x}_{k|k-1} + K_k(y_k - \hat{y}_k) \qquad (1.13f)$$

$$P_{k|k} = P_{k|k-1} - K_k H_k P_{k|k-1} \qquad (1.13g)$$

where $$F_k = \frac{\partial f_k}{\partial x}, \quad H_k = \frac{\partial h_k}{\partial x} \qquad (1.14)$$

Similar as before, equation (1.13a) is the predicted state estimate, equation (1.13b) is the predicted covariance estimate, equation (1.13c) is the innovation or measurement residual, equation (1.13d) is the innovation or residual covariance, equation (1.13e) is the Kalman gain, equation (1.13f) is the updated state estimate, equation (1.13g) is the updated covariance estimate.

Filters such as the Kalman filter and its variants are suitable for tracking the state of a single object, such as a car or other vehicle, in environments with no clutter, i.e. where every measurement is known to originate from the tracked object. However, many real-world scenarios involve sensors which introduce clutter, or sometimes don't detect the real object.

A typical example to illustrate clutter and the possibility of not detecting the tracked object is the use of a radar sensor to track a single airplane. Every time the radar is polled it returns a variable length list of distance angle detection pairs made since the last time step. Even given that we know for sure that only one airplane is present within the field of view of the radar, the sensor when polled may yield zero, one, or multiple detections due to disturbances. This stands in contrast to simple sensors such as those comprised in Inertial Measurement Units (IMUs) and encoders which always return a fixed size data structure when polled. Those radar detections which are due to disturbances and not associated to the object we desire to track are called clutter. Given a set of detections from the radar, it is also possible that none of them correspond to the true object. This would obviously be the case if the radar did not detect anything at the current time step, and could for example be the result of the object holding an unfavourable angle to the radar, or that something is blocking the view from the radar to the object. In order to for example make use of such sensors as the radar in a tracking system, methods of handling clutter and missed detections need to be formulated.

One way to deal with clutter is to simply discard detections that are unlikely to originate from the plane given the prior. This is known as gating. Gating forms an important part of clutter rejection measures in many more complex filters. Using gating on its own to deal with clutter may be feasible in scenarios with low clutter intensities, however as the amount of clutter increases it becomes more important to model the clutter in order to reject it with higher accuracy. One commonly used model of clutter is the Poisson Point Process (PPP). In this model, the clutter measurements are independent and identically distributed. At each time step, the number of clutter measurements n in the volume V surveillance by the sensors is Poisson distributed with expected value $\bar{\lambda}$. In addition to introducing clutter measurements, an imperfect sensor may also not detect the tracked object at each time step. This property may be modelled with a Bernoulli Process. Using the Bernoulli Process model, at time step k, the object is detected with probability $\rho$ and undetected with probability $1-\rho$. Given that the object is detected, it is distributed according to some distribution with probability density function g(y).

Further, the Multi-Bernoully Mixture (MBM) filter is an algorithm for tracking multiple separate objects in the presence of clutter. The MBM filter represents the state as a superposition of hypotheses, where each hypothesis is a union of Bernoulli Processes. Each such Bernoulli Process may be interpreted as one possible object to track.

As mentioned, methods and apparatuses of the embodiments disclosed herein estimate a road geometry by estimating lane centers of the lanes of the road. In accordance with some embodiments, the curve of the lane center are parametrized using clothoid splines, polynomials, or lateral offsets at fixed longitudinal positions. Even though the present description may be focused on lane center parametrization using clothoid splines, it is readily understood by the skilled person in the art that other parametrizations are feasible.

In general, a clothoid is a 2D curve with constant rate of curvature change along the curve. A clothoid spline is thus a connection of multiple clothoid curves constrained such that the curvature is continuous. To find the geometry of the clothoid spline, the following differential equation may be solved:

$$\frac{d}{dl}\begin{bmatrix} x \\ y \\ \phi \end{bmatrix} = \begin{bmatrix} \cos\phi \\ \sin\phi \\ k \end{bmatrix} \quad (1.15)$$

where x(l), y(l) are the Cartesian coordinates of the point a distance l along the curve, $\phi(l)$ is the heading angle of the curve and k(l) is a continuous piecewise linear function describing the curvature of each segment—within each segment the slope of k, i.e. the curvature rate, is constant.

In some embodiments, the center line parametrization comprises 3D clothoid splines. This may be advantageous in scenarios where the perception data derived from the output of one or more vehicle-mounted sensors comprises 3D road feature coordinates. Accordingly, equation (1.15) may be extended to 3D according to $$\frac{d}{dl}\begin{bmatrix} x \\ y \\ z \\ \phi \\ \theta \end{bmatrix} = \begin{bmatrix} \cos\phi\cos\theta \\ \sin\phi\cos\theta \\ \sin\theta \\ k \\ \gamma \end{bmatrix} \quad (1.16)$$

where the azimuthal angle $\theta(l)$ and its corresponding piecewise linear curvature $\gamma(l)$ have been introduced.

A visualization of the parametrization of the road (i.e. "road model") in accordance with some embodiments is depicted in FIG. 2. Each subfigure (a)-(d) in FIG. 2 shows a different subset of the parametrization parameters in accordance with some embodiments. In the depicted example of FIG. 2, the road has two main road lanes and one branch lane. The center line curvature and width of the lanes are described by splines. The main road splines have four segments and the branch has three segments as illustrated in subfigure (b), i.e. in the top-right subfigure. In this bird's eye view (or top view) the parameters controlling the vertical position of the road are omitted for visual clarity. In short, the parameters y, x and $a_i$ are distances, $\phi_i$ are angles, $k_i$ are curvatures, and $$w_{im}^n$$

are widths. As mentioned, curve and width parametrizations other than clothoid and linear splines may be used.

Starting from the description of the ego-lane center as a 3D clothoid parametrized by curvatures $$k_0^n$$

at the edge of each segment (these curvatures may then be varied linearly in-between the segment edges). The width of the ego-lane is used to describe the possible locations of lane markers. The ego-lane markers would be located next to the ego-lane center, at a parallel offset to the lane center by half the lane width. Moreover, the adjacent lanes main road lanes, i.e. the other lanes of the main road, may be modelled using the same method by using their width to describe them as parallel offsets from the ego-lane. Each so-called main road lane m may be given its own width profile as a piecewise linear function parametrized by segment edge widths $$w_{0m}^n.$$

The length of both the clothoid and width segments may be defined as $$L_0^n,$$

and there are $N_0$ main road segments in total. Finally, the number of main road lanes may be defined as M and the index of the ego-lane within these m lanes is $m_0$.

The width parametrization may comprise a constant value, which may for example be predefined based on regulations in the geographical jurisdiction of the vehicle (e.g. 10-11 feet for the US or 2.5-3.25 meters in Europe). However, in some embodiments the width parametrization may comprise a function of length (of the lane).

Furthermore, branch lanes may be introduced to the parametrization of the road in order to estimate the center of the lanes merging into or diverging from the main road. A branch b can attach to any one of the main road lanes, $m_b$, at a parameter-controlled distance $a_b$ along the main road lane, and angles $\phi_b$ to the connecting main road lane. From the root of the branch, its curve and similarly to the ego-lane can be described by a 3D clothoid spline with curvatures $$k_b^n.$$

The width of the branch may also be described by a piecewise linear function, parametrized by $$w_b^n,$$

but constrained to have the same width as the main road lane it connected to at its root (i.e. the connecting main road lane). Thus, one can omit $$w_b^0.$$

The length of both the branch clothoid and width segments are $$L_b^n,$$

and there are $N_b$ branch lane segments in total. The total number of branches is B.

Further, the pose of the ego-vehicle in relation to the road may be parametrized. This may be done by describing the vehicle pose in relation to the starting point 201 of the ego-lane center. The ego-vehicle pose may be given by three spatial coordinates x, y, and z as well as three Tait-Bryan angles $\phi$, $\theta$ and $\psi$ representing yaw, pitch, and roll respectively.

As mentioned, the road parametrization proposed herein comprises a lane center parametrization for each lane of the road and a width parametrization for each lane of the road. This is in contrast to many conventional road model estimation techniques whose road parametrization is focused on lane delimiters. However, an advantage of having a road parametrization focusing on a lane center parametrization and a width parametrization rather than lane delimiter parametrization is that one gets improved performance in situations where there are no lane delimiters near the road edges. Moreover, lane center estimations are directly consumed by downstream functions of an ADS, such as path planning functions as they are generally configured to steer the vehicle based on the lane center estimate. Moreover, the tracking filter is more robust as it allows for using measurement data (i.e. perception data) in the form of vehicle detections as it can be assumed that other vehicles attempt to center themselves in a lane and that the vehicle detections therefore can be associated to the lane centers of the road parametrization. Moreover, another advantage of having a road parametrization focusing on a lane center parametrization and a width parametrization rather than lane delimiter parametrization is that complex road geometries with branch lanes are easier to model while it is generally challenging to connect branch lanes to the appropriate main road lane when using a road parametrization focused on lane delimiters.

To formulate the dynamic model, one may define the state space representation of the parametrization of the road (i.e. the road model). All continuous parameters of the parametrization of the road, those being $$x,\ y,\ z,\ \phi,\ \theta,\ \psi,\ \phi_b,\ k_i^n,\ \gamma_i^n,\ w_{0m}^n,\ w_b^n\ \text{and}\ a_b,$$

are concatenated into the state vector x. Furthermore, all discrete parameters of the road model $$L_i^n,\ M,\ B,\ N\ \text{and}\ m_i$$

are concatenated into a metadata vector $\xi$. Moreover, the road model may be extended with auxiliary variables $\rho_c \in [0,1]$, which model the existence of each lane c=1, . . . , M+B, main road lanes and branch lanes of the road geometry. This in the sense that given the rest of the road model, lane c only exists with probability $\rho_c$ independent of the existence of the other lanes. This is similar to the existence probabilities introduced for the MBM filter, but in contrast to the MBM filter the object state of the herein proposed tracking filter is not described Bernoulli random finite sets. These existence variables into the vector $\rho$. The complete augmented road model state is thus $[x^T, \xi^T, \rho^T]^T$. The control signal $u_k$ at time step k comprises a vehicle speed $v_k$, and optionally a yaw rate $\omega_{z,k}$. Moreover, the control signal $u_k$ at time step k may further comprise a roll rate $\omega_{x,k}$ and a pitch rate $\omega_{y,k}$.

Still further, a geometry state transition model may be defined in order to describe the expected change in parameter values from one time step to the next based on the control signal. Neglecting process noise, the motion model may comprise updating the ego vehicle pose, $$x_k = x_{k-1} + \Delta tv \cos\phi_{k-1}\cos\theta_{k-1} \qquad (1.17a)$$

$$y_k = y_{k-1} + \Delta tv \sin\phi_{k-1}\cos\theta_{k-1} \qquad (1.17b)$$

$$z_k = z_{k-1} + \Delta tv \sin\theta_{k-1} \qquad (1.17c)$$

$$\phi_{0,k} = \phi_{0,k-1} + \Delta t\omega_{z,k} \qquad (1.17d)$$

$$\theta_{0,k} = \theta_{0,k-1} + \Delta t\omega_{y,k} \qquad (1.17e)$$

$$\psi_{0,k} = \psi_{0,k-1}\Delta t\omega_{x,k} \qquad (1.17f)$$

where $\Delta t$ is the time step, and with all the other components of x remaining constant except for the process noise. Moreover, to compensate for motion of the ego-vehicle along the main road, whenever the vehicle has progressed too far along the main road a segment is removed from the back of the road and simultaneously one is added to the front. When this happens, all the state variables connected to segments of the main road are shifted backwards in the state vector to reflect the new segment layout. In order to aid with merging, branches do not change their length or number of segments, but simply forever retain the length they were initialized with.

To account for that the number of lanes in the road may increase from one time step to the next, the state transition adds some new lanes to the state every time step. In some embodiments, the tracking filter may apply a lane spawning model where the lane spawning is based on an assumption that the number of lanes does not grow very rapidly. Thus, these new lanes are given a low probabilities of existence $\rho_c$. In some embodiments, single additional main road lanes at the very left and very right of the main road are spawned. The state parameters controlling the width of the main road lanes as well as the indices $m_i$ are shifted over accordingly. Furthermore, with regards to the spawning of branch lanes, one may spawn one diverging and one merging branch lane starting from the rightmost main road lane with sufficient width and existence probability. For computational performance reasons one can neglect spawning of branches to the left of the main road, in particular for highway scenarios, as such on ramps or off ramps are not common in places where one drives on the right side of the road. Thus, the addition or spawning of branch lanes may be dependent on local traffic regulations (i.e. if the current the current geographical jurisdiction of the vehicle applies right-side traffic or left-side traffic).

Furthermore, in some embodiments, the tracking filter may apply a lane death model. In more detail, a probability of survival $P^S$ representing the probability that each individual lane survives from one time step to the next, is introduced. The probability of survival is then used to update the probabilities of existence of each lane according to $$\rho_{c,k} = P^S \rho_{c,k-1} \qquad (1.18)$$
$$c = 1, \dots , M_{k-1} + B_{k-1}$$

Additionally, lanes whose width is below some threshold and branches where $a_b$ has become negative may be removed from the filter state.

The geometry state transition model, the lane spawning model, and the lane death model may be summarized in three transition equations $$x_k = f_x(x_{k-1}, \xi_{k-1}, \rho_{k-1}, u_k) \qquad (1.19a)$$
$$\xi_k = f_\xi(x_{k-1}, \xi_{k-1}, \rho_{k-1}, u_k) \qquad (1.19b)$$
$$\rho_k = f_\rho(x_{k-1}, \xi_{k-1}, \rho_{k-1}, u_k) \qquad (1.19c)$$

where process noise has been excluded. In particular, $f_x$ is generally given by equations 1.17a-f, disregarding spawning and cases where the road segments are shifted to avoid negative $$L_0^n$$

and when the number of segments in a branch is increased. The complete dynamic model including noise is then given by $$x_k = f_x(x_{k-1}, \zeta_{k-1}, \rho_{k-1}, u_k) + q_k \qquad (1.20a)$$
$$\xi_k = f_\xi(x_{k-1}, \xi_{k-1}, \rho_{k-1}, u_k) \qquad (1.20b)$$
$$\rho_k = f_\rho(x_{k-1}, \xi_{k-1}, \rho_{k-1}, u_k) \qquad (1.20c)$$

where $q_k \sim \mathcal{N}(0, Q_k)$ is the process noise.

Furthermore, a measurement model is provided that describes the measurements $\hat{y}$, here the coordinates of the points of the road features (e.g. lane markings) one would expect to receive given a value of the state vector. In some embodiments of the herein proposed model, except for clutter, lane marking measurements may only occur on either edge of a lane, separated from the lane center by half the width of the lane. These lines may be known as delimiters. The process of associating real measurements to delimiters of the model is handled by the filter, and further discussed below. For notational brevity, the time step index k is dropped in reference to the measurement model discussion. Also, the following discussion will be focused on road features in terms of lane markings or delimiters for illustrative purposes. However, this should not be interpreted as that the measurement model is limited to measurement data comprising road features in terms of lane markings but may additionally or alternatively include other road features, and even other objects (i.e. other vehicles).

Figure 3A:
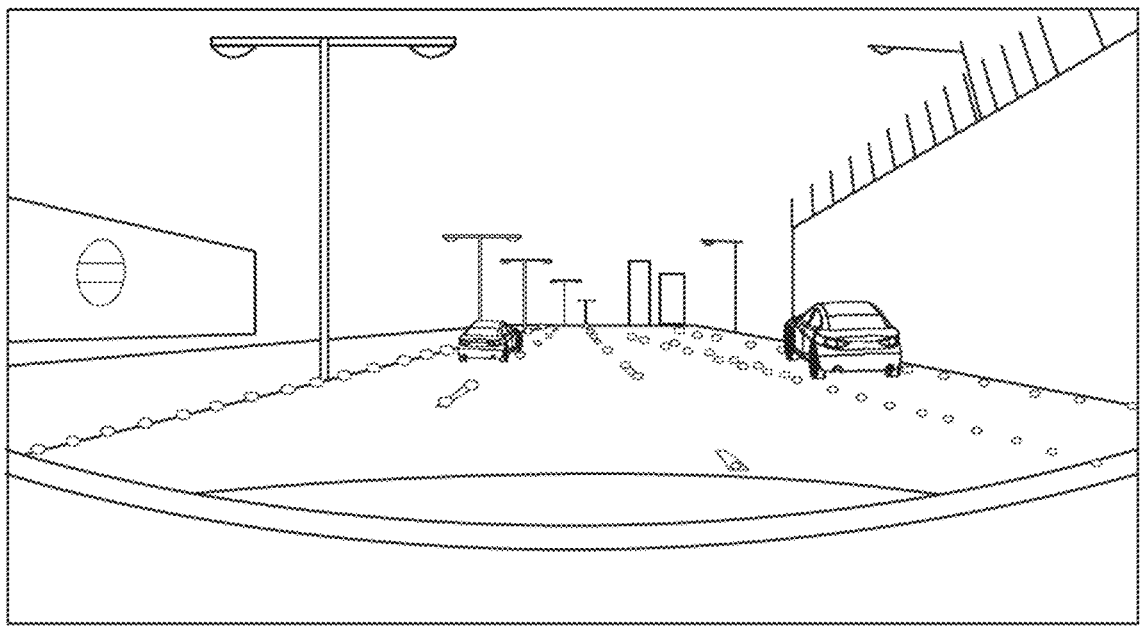
FIG. 3a is a schematic illustration of an image frame taken by a front-facing vehicle mounted camera with re-projected lane marking points.
Figure 3B:
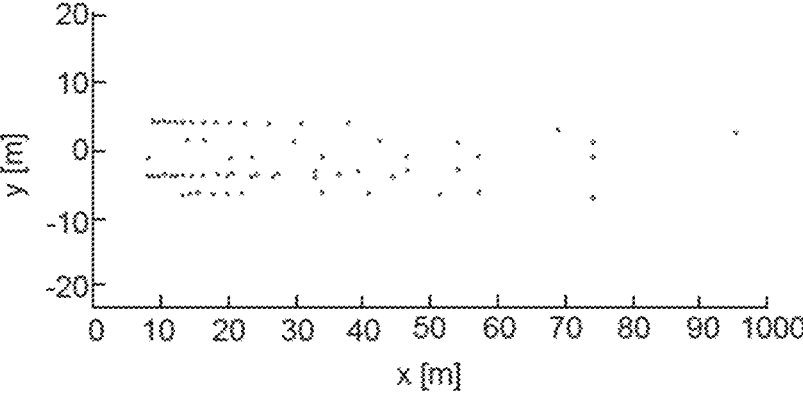

FIG. 3a is a schematic illustration of an image captured by a front-facing vehicle-mounted camera where re-projected lane marker detections have been added. The detections illustrate typical output of a 3D lane marking detection algorithm. FIG. 3b is a bird's eye view of the same 3D lane marking points which were re-projected into the camera image. In more detail, the output of a 3D lane marking detection algorithm is a set of 3D coordinates along with uncertainty estimates of these coordinates. Since uncertainty estimates are generally provided in the output of the 3D lane marking detection, they are suitable for use as measurements in the update step of the herein proposed tracking filter.

Moreover, only existing delimiters can be detected. From p one can only directly get the probability that each lane center exists, but here one can assume that given that a lane exists, both its right and left delimiters also exist. Of the existing delimiters each has a probability $P^D$ being detected. A detected delimiter gives off at least one measurement, while an undetected delimiter gives of no measurements. In the following the measurements given off by each detected delimiter is described.

As depicted in FIG. 2, the parametrization of the road model in accordance with some embodiments, provide a description of the geometry of the delimiters in the local coordinate frame of the ego-road. As the delimiters of the main road are described in relation to ego-lane center, the geometry of this center line is needed. This may for example be done by integrating equation (1.16) for the lane center parameters using the Euler method with step size $\Delta l$, with the initial condition for coordinates and angles set to zero as one is working in the local coordinate frame of the ego-road. From this one gets $$\begin{bmatrix} x_{0,i} \\ y_{0,i} \\ z_{0,i} \\ \phi_{0,i} \\ \theta_{0,i} \\ l_{0,i} \end{bmatrix} = \begin{bmatrix} \cos \phi_{0,i-1} \cos \theta_{0,i-1} \\ \sin \phi_{0,i-1} \cos \theta_{0,i-1} \\ \sin \theta_{0,i-1} \\ k_0(l_{0,i-1}) \\ \gamma_0(l_{0,i-1}) \\ 1 \end{bmatrix} \qquad (1.21)$$
$$i = +1, +2, \dots$$

where $k_0(l)$ and $\gamma_0(l)$ represent linear interpolation over the $$k_0^n \text{ and } \gamma_0^n$$

parameters respectively.

Similar differential equations, this time for linear splines instead of clothoid splines are solved in the same manner in order to get the sequence of widths $(w_{0m,i})_i$ corresponding to $(\langle x_{0,i}, y_{0,i}, z_{0,i}, \phi_{0,i}, \theta_{0,i,l_{o,i}} \rangle)_i$ of the different main road lanes. One is now able to give the coordinates of points on the main road delimiters as $$r_{d,i} = \begin{bmatrix} x_{0,i} \\ y_{0,i} \\ z_{0,i} \end{bmatrix} + R_z(\phi_{0,i}) \begin{bmatrix} 0 \\ A_d \\ 0 \end{bmatrix} \begin{bmatrix} w_{01,i} \\ \vdots \\ w_{0M,i} \end{bmatrix} \qquad (1.22)$$

where $R_z(\phi) \in \mathbb{R}^{3 \times 3}$ is the rotation matrix representing rotation of an angle of $\phi$ around the z axis, and $A_d \in \mathbb{R}^{1 \times M}$ is a matrixed used for calculating the offset of delimiter d from the ego-lane. Since there are M main road lanes, there are M+1 main road delimiters. For M=2 and the ego-lane index $m_0$=2 one would, for example, have $$A_1 = [-1 \ -0.5], \qquad (1.23)$$
$$A_2 = [0 \ -0.5],$$
$$A_1 = [0 \ 0.5]$$

The coordinates of a point on the branch lanes may be computed in a similar fashion by first solving the differential equations of the center line parametrization (e.g. clothoid) and lane width parametrization using the Euler method. An initial condition for the center line parametrization, the position is calculated by linear interpolation of the center polyline of the parent main road lane (which is computed similarly to equation (1.22) but with A matrices modified accordingly) a distance $a_b$ along the ego-lane center (see e.g. subfigure (c) of FIG. 2). The initial angle is similarly computed by interpolating the main road lane angles, and then adding the initial angles $\phi_b$ and $\theta_b$ of the branch. The initial curvatures are directly given as $$k_b^0 \text{ and } \gamma_b^0.$$

For the initial width of the branch lane, this is interpolated from the width of the parent main road lane (i.e. connecting main road lane). In total, counting both the main road delimiters and branch lane delimiters there will be D=M+1+2B delimiters with coordinate sequences $r_{d,i}$.

In the foregoing the description of the road geometry is given in relation to the road frame. However, the measurements (i.e. perception data) is generally given in the ego-vehicle frame. This frame is aligned with the vehicle with its origin on the center of the rear axle, the x-axis pointing forward, the y-axis left along the rear axle, and z-axis upwards. However, the parameters of the ego-vehicle pose, x, y, z and $\phi$, $\theta$, $\psi$ can be transformed to the road-aligned lane delimiter geometry $(r_{d,i})_i$ into the ego-vehicle frame, resulting in the sequences $$(r'_{d,i})_i.$$

Lane marking detections are assumed to be produced by the points along the polylines defined by $$(r'_{d,i})_i.$$

In accordance with some embodiments, it is assumed that given a lane marking measurement coordinate $y_j$ originating from delimiter d, it was produced by the point on the delimiter polyline closest to $y_j$. Also, as previously mentioned, the raw measurements are received in the form of 3D coordinates. In order to reduce the dimension of the measurement vector, one can seek to find a more compact representation of the innovation than the difference between 3D points. One example representation of the innovation is the vector of distances between the measured lane marking coordinates and their corresponding delimiter polylines. The measurement function h(x,ξ) is in that case always the zero vector. The measurement model may however also include additive measurement noise r~ $\mathcal{N}$ (0,TRT$^T$), where R is the covariance matrix of the 3D coordinates $y_j$ and T is an association dependent matrix which is used to transform R into the covariance of the distance between $y_j$ and the delimiters.

With the road model defined, one then has to design a filter to estimate the parameters of the road model. In accordance with some embodiments, the tracking filter is a multiple hypothesis tracker. In each hypothesis h, the x portion of the state is represented by a single Gaussian density with mean $\hat{x}^h$ and the covariance matrix $P^h$. Thus, all the lane of the road are coupled. The rest of the state, ξ and ρ are assumed to be known and equal to $\hat{\xi}$ and $\hat{\rho}$ respectively within each hypothesis. The uncertainty in these variables thus comes from having multiple hypotheses.

The prior state density of the filter can be described by $$\left( \left( w_{k-1|k-1}^h, \hat{\rho}_{k-1|k-1}^h, \hat{\xi}_{k-1|k-1}^h, \hat{x}_{k-1|k-1}^h, P_{k-1|k-1}^h \right) \right)_{h=1}^{H_{k-1|k-1}} \qquad (1.24)$$

where $w_{k-1|k-1}^h$ are hypothesis weights.

In order to simplify the computation, one can assume that the probability of survival $P^S$ is constant and lane independent, and a PPP clutter model may be used with constant intensity $\lambda^C$. The filter algorithm itself may further support state dependent probabilities of survival and other clutter models than the PPP. For the probability of detection one can let it be state dependent such that it is greater for lane in front of, and near, the ego-vehicle and trails off outside this region. Moreover, in order to simplify the computation, one does not need to evaluate the probability of detection for the entire state density, but only evaluate it for the estimation mean $\hat{x}$.

Figure 4:
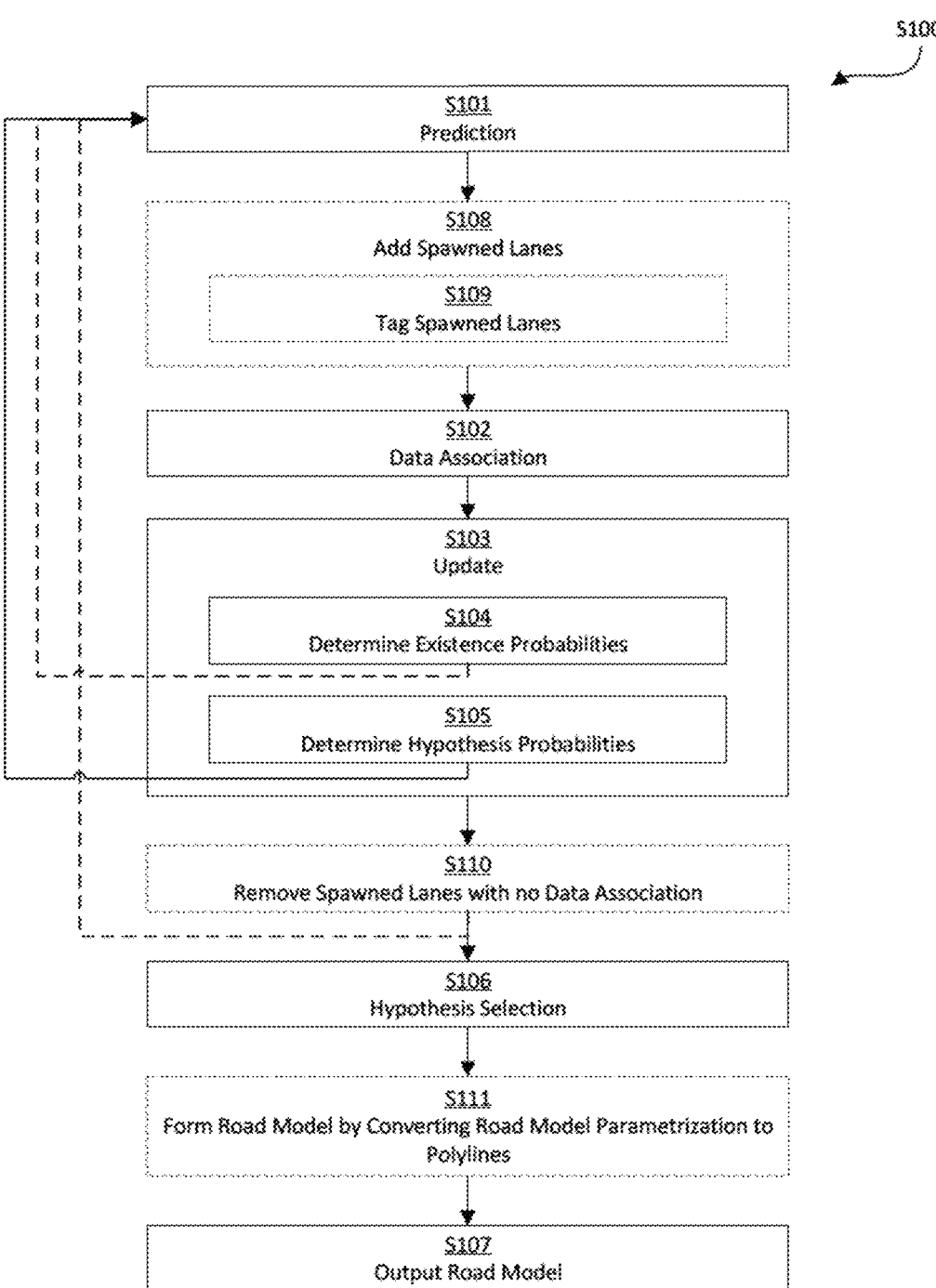
FIG. 4 is a schematic flowchart representation of a method for estimating a road geometry of a road upon which a vehicle is traveling in accordance with some embodiments.

FIG. 4 is a schematic flowchart representation of a method S100 for estimating a road geometry of a road upon which a vehicle is traveling. The road geometry is described by a filter state that is tracked by a tracking filter, where the filter state comprises a plurality of road model hypotheses. The tracking filter may be referred to as a multiple hypothesis multi-object tracking filter that is designed to track the filter state. Moreover, each road model hypothesis is associated with a probability and also comprises a parametrization of the road describing a geometry of one or more lanes of the road and each lane of each road model hypothesis is associated with a probability of existence. Accordingly, the filter state contains a probability density over the parameters of the road parametrization. Stated differently, the filter state is described by a set of hypotheses corresponding to configurations of the road model (i.e. the parametrization of the road), and each hypothesis has an associated probability. However, within each hypothesis, each lane has a probability of existence.

Furthermore, as mentioned in the foregoing, the tracked "objects" of the tracking filter are lane centers and lane widths in accordance with some embodiments. Thus, the tracking filter does not track lane markers. However, it follows from knowing the geometries of the lane centers and widths that one can describe the left and right borders of the lanes, which is where one would expect lane markers to appear. Moreover, the tracking filter is hypothesis oriented, and not track oriented. Also, all parameters of the road model (i.e. the parametrization of the road) are coupled.

The method S100 is preferably a computer-implemented method S100, performed by a processing system of the ADS-equipped vehicle. The processing system may for example comprise one or more processors and one or more memories coupled to the one or more processors, wherein the one or more memories store one or more programs that perform the steps, services and functions of the method S100 disclosed herein when executed by the one or more processors.

The method S100 is performed as a loop and the method steps are repeated with some sample frequency (e.g. 10 Hz, 20 Hz, 50 Hz, etc.) depending on the set requirements and/or available computational power and/or available memory resources. Thus, for each time step out of a plurality of consecutive time steps, the method S100 comprises predicting S101 a filter state by determining a probability density of each road model hypothesis based on vehicle motion data and a prior filter state determined at a preceding time step. In some embodiments, the prediction S101 step comprises making an Extended Kalman Filter (EKF) prediction of a state estimate and a covariance estimate for all hypothesis using a motion model accounting for the prior filter state, such as e.g. the motion model defined in equation (1.20a). Here, the vectors $\xi$ and $\rho$ can be updated according to equations (1.19a) and (1.19b) respectively. The weight of each hypothesis may be left unchanged. In some embodiments, the vehicle motion data comprises a vehicle speed at the time step. However, the vehicle motion data may further comprise a yaw rate, a roll rate, and/or a pitch rate at the time step.

In some embodiments, the method S100 comprises adding S108 one or more main road lanes and/or one or more branch lanes to each road model hypothesis of the predicted S101 filter state. Each of these added S108 lanes comprise a corresponding parametrization (e.g. having a lane center parametrization and a lane width parametrization). The added S108 lanes may be construed as candidates for new lanes that have not yet been detected. Moreover, in accordance with some embodiments, the method S100 further comprises tagging S109 the added S108 one or more main road lanes and/or one or more branch lanes. By tagging S109 the added S108 lanes, one facilitates the subsequent removal of added S108 lanes that are not associated with any road features obtained from perception data.

The method S100 further comprises associating S102 road features obtained from perception data derived from an output of one or more vehicle-mounted sensors with the parametrization of the road of each road model hypothesis of the predicted filter state. This may also be referred to as data association S102. In some embodiments, the road features obtained from perception data derived from an output of one or more vehicle-mounted sensors comprises lane marking detections obtained from a lane tracking algorithm configured to output coordinates of lane markers depicted in images output from a vehicle-mounted camera.

The term "perception data" refers to the information gathered by sensors and other technologies that are used by ADS-equipped vehicles to detect and interpret their environment. This includes data collected from cameras, lidar, radar, and other sensors that help the vehicle "perceive" its surroundings and make decisions based on that information. The perception data collected by the vehicle may include the position, speed, and direction of nearby objects, position and type of road markings, position and type of traffic signs, and other relevant information. This data may then be processed by the vehicle's onboard computer to help it make decisions on steering, acceleration, braking, and other actions necessary to safely navigate the environment. Accordingly, the term "perception" data may refer to "surroundings assessment" data, "spatial perception" data, "processed sensory" data and/or "temporal dependencies" data, whereas perception "data" may refer to perception "information" and/or "estimates". The term "obtained" from a perception module or perception system, on the other hand, may refer to "derived" from a perception model and/or "based on output data" from a perception module or system, whereas perception module/system configured to "generate the set of perception data" may refer to perception module/system adapted and/or configured to "estimate the surroundings of said vehicle", "estimate at least a portion of surroundings of said vehicle", "determine surroundings of said vehicle", "interpret sensory information relevant for the autonomous maneuvering of said vehicle", and/or "estimate surroundings of said vehicle and make model predictions of future states of the surroundings of said vehicle".

In the context of the present disclosure, data association S102 refers to the process of associating the measurements from various sensors with the corresponding features in the parametrization of the road of each hypothesis. It involves determining which measurements correspond to which objects or elements in the environment, such as lanes boundaries. In the data association step S102, the tracking filter attempts to match the incoming sensor measurements with the features in the parametrization of the road by considering the probability of each potential association. In general, the objective is to find the most likely correspondence between the measurements and the parameters of the road parametrization.

Furthermore, in accordance with some embodiments, the spawning or addition S108 of one or more main road lanes and/or one or more branch lanes to each road model hypothesis of the predicted S101 filter state is performed before the data association step S102. This may be counter-intuitive as one would assume that the spawned lane candidates may be better estimates once the measurement data is available. However, by performing the lane spawning S108 prior to the data association S102, the tracking algorithm is easier to implement. Moreover, performing the lane spawning S108 prior to the data association S102 makes the tracking filter better at handling complex scenarios (i.e. complex road geometries) as the tracking filter is not limited by the measurement data during the lane spawning and moreover provides for an improved accuracy as lane spawning after the data association process would be a more coarse mathematical approximation, which induces a risk of missing potential lanes.

Further, the method S100 comprises determining S104 an existence probability for each lane of road model hypothesis based on a prior existence probability for each corresponding lane determined at the preceding time step and the road feature association S102. In other words, based on the road feature association one computes an existence probability of a particular lane in view of how well the road features (obtained from the perception data) match the lane parametrization within a hypothesis, and incorporate the prior existence probability of that lane determined at the preceding time step. In more detail, determining the existence probability of a lane may be construed as assessing the likelihood or probability that a lane actually exists in the road environment within a road model hypothesis. This concept is particularly useful when dealing with complex road scenes where lane markings may be partially occluded, faded, or missing. To determine the existence probability of a lane, the tracking filter may be configured to consider factors such as the reliability and consistency of the measurements over time (i.e. of the road features obtained from perception data). For example, if the measurements consistently align with the predicted lane state, the existence probability may be increased. Conversely, if the measurements are sporadic, inconsistent, or deviate significantly from the predicted state, the existence probability may be decreased.

Still further, the method S100 comprises determining S105 a probability of each road model hypothesis of the plurality of road model hypotheses based on the prior filter state determined at the preceding time step and the determined existence probability of each lane of that road model hypothesis. The determination S104 of the existence probabilities and the determination S105 of the probability of each hypothesis may be considered as the "update" step of Bayesian filtering, such as an EKF update step. However, in some embodiments the data association S102 forms a part of the update step. It should be noted that an update "step" may include several parts or sub-steps. Moreover, the update step S103 or the data association step S102 may further comprise updating, correcting, or changing the parameters of the parametrization of the road (i.e. the parameters of the road model) to better fit the road features obtained from perception data (i.e. to better fit the measurement data).

In some embodiments, method S100 further comprises removing S110 any added S108 main road lanes and branch lanes that have no road feature association. In other words, if the newly added potential candidate lanes did not get any road features associated to them, they are removed from the filter state.

The method S100 further comprises selecting S106 the road model hypothesis associated with the highest probability based on the determined probability of each road model hypothesis. The method S100 may further comprise forming S111 the road model based on the parametrization of the road of the selected road model hypothesis by converting the road model parametrization to polylines describing lane centers of the lanes of the road. In other words, a suitable representation of the road geometry and its uncertainties are extracted from the filter state.

Further, the method S100 comprises outputting S107 a road model based on the parametrization of the road of the selected road model hypothesis. In some embodiments, the road model is output to a path planning function of an automated driving system of the vehicle, the path planning function being configured to generate paths for the vehicle to execute. However, as the skilled person in the art readily understands, a path planning function is only on example out of several "down-stream" functions of an ADS that relies on a road model input. Other examples include trajectory planning functions, emergency action functions, pilot functions, lane-change assist functions, and so forth.

Moreover, in accordance with some embodiments, the tracking filter recurses back to the prediction step S101 after the determination of hypothesis probabilities S105. However, in some embodiments, the tracking filter recurses back to the prediction step S101 after the determination S104 of existence probabilities S104, or after the removal S110 added lanes.

Further, in relation to the update step S103, in some embodiments, the input to the update step S103 is accordingly a prior filter state (e.g., a set of prior hypotheses) and measurement data that includes coordinates of road features (e.g. lane marker detections) and their corresponding covariances. In the following, an update step for a single hypothesis in accordance with some embodiments will be described. The same procedure can be applied in all hypotheses, and the resulting posterior hypotheses are concatenated at the end of the update step. For the update, the road features obtained from perception data may comprise J lane marking coordinate measurements $y_j \in \mathbb{R}^3$ and their joint covariance matrix $R \in \mathbb{R}^{3J \times 3J}$.

In some embodiments, the first half of the update step is to produce a number of data association hypotheses. In order to simplify, the measurement points $y_j$ may first be gated. This may be done by considering each point individually and comparing it to all available delimiters d. A point is only allowed to be associated to the delimiters where the Mahalanobis distance is below a threshold, and only to a capped number of delimiters determined by maximizing the likelihood of association as approximated by $$\mathcal{N}(\Delta_{j,d}; 0; S_j^d),$$

where $\Delta_{j,d}$ is the closest distance between $y_j$ and delimiter d and $$S_j^d$$

the corresponding innovation covariance. Next, the points may be clustered using a clustering algorithm, and a similar gating process may take place for each cluster. Clusters are however also allowed to be associated to both a branch delimiter, and the main road delimiter of the parent lane of the branch at the same time. Thus, it is possible to associate multiple lane marking detections to each delimiter. After performing these steps, each cluster has a set of possible associations of points within the cluster, either to delimiters or to clutter. Next, all possible combinations of cluster associations are produced to create a first set of data association candidates. Finally, these candidates are then restricted further by not allowing two likely incompatible lane marking points to be associated to the same delimiter. Compatibility between lane marking clusters is checked by fitting a third-degree polynomial to the markers of the two clusters and checking the fraction of inliers from each cluster.

Then, focusing on a single data association hypothesis and letting $d(j)$ be the delimiter associated to measurement $y_j$ in this hypothesis, $d(j)=0$ if $y_j$ is associated to clutter. The goal is to perform an EKF update step. In order to reach this point, one calculates and construct the innovation vector $\Delta$ from concatenation of $\Delta_{j,d(j)}$ for $d(j)\neq0$ the matrix H (see equation (1.14)) is constructed by finding the gradient of the point on $d(j)$ closest to $y_j$ in the direction $a_{j,d(j)}$ of $y_j$. Finally, the measurement noise is $TRT^T$ where T is the subset of rows j such that $d(j)\neq0$ of the block diagonal matrix $$a_{j,d(j)}^T.$$

Using these vectors and matrices, one can compute the innovation covariance S and the posterior mean and covariance $$\hat{x}_{k|k}^{h'}, P_{k|k}^{h'}.$$

21

Here h' is the index of the posterior hypothesis which originated from h and the data association that is being considered.

Next, one computes the updated hypothesis weight $$\mathcal{W}_{k|k}^{h'}$$

and existence probabilities $$\rho_{k|k}^{h'}.$$

Given the data associations, it is known which subset of all delimiters D were detected, namely $$D^D = \{d(j) : j \in J, d(j) \neq 0\} \tag{1.25}$$

where $J = \{1, \ldots, J\}$. If we let C be the set of all lanes c, then the possible combinations of lanes which could have existed to get measurements from the delimiters in $D^D$ are $$C^D = \{C^E \in P(C) : D^D \subseteq d(C^E)\} \tag{1.26}$$

where P(C) is the power set of set $C^E$ and $d(C^E)$ is the set of delimiters belonging to any of the lanes in $C^E$. The probability that exactly the lanes in subset $C^E \in C^D$ exists and that out of the delimiters of those lanes, exactly $D^D$ were detected is $$\tilde{u}^{C^E} = (P^D)^{|D^D|}(1 - P^D)^{|d(C^E)\backslash D^D|} \prod_{c \in C^E} \rho_{c,k|k-1} \prod_{c \in C\backslash C^E} (1 - \rho_{c,k|k-1}) \tag{1.27}$$

Note that a lane independent probability of detection has been assumed in this equation. However, it is possible for the filter to have different probability of detection for each lane. Given that one knows that $C^E$ must be an element of $C^D$, one can calculate the corresponding conditional probabilities by normalizing $$u^{C^E} = \frac{\tilde{u}^{C^E}}{\sum_{C^{E'} \in C^D} \tilde{u}^{C^{E'}}} \tag{1.28}$$

Accordingly, $C^D$ contains the possible combinations of lanes which are compatible with the data association. Each combination has weight $u^{C^E}$. However, to obtain recursive filtering recursions it is desirable to have the existence of lanes in the posterior to be independent. One can either add new hypotheses for all the $|C^D|$ cases, but since the state density in these hypotheses would all have the same mean and covariance this seems inefficient. Therefore, one can summarize all the cases in a single hypothesis where one approximates the lane existences as independent. The updated existence probabilities are computed as

22

$$\rho_{c,k|k}^{h'} = \sum_{C^E \in C^D} \tilde{u}^{C^E} 1_{C^E}(c) \tag{1.29}$$

Then, for the completion of the update step, it remains to compute the new hypothesis weight $$\mathcal{W}_{k|k}^{h'},$$

which has four contributing factors: The prior weight, $\tilde{u}^C$, the probability of the data association, the clutter intensity, and the measurement likelihood. Gathering these all together one gets $$\mathcal{W}_{k|k}^{h'} \propto \mathcal{W}_{k|k-1}^h \left( \sum_{C^E \in C^D} \tilde{u}^{C^E} \right) (\lambda^C)^{|\{j \in J, d(j)=0\}|} \mathcal{N}(\Delta; 0; S) \tag{1.30}$$

Then, by combining all the resulting hypotheses, and normalizing the weights $$\mathcal{W}_{k|k}^{h'},$$

such that they sum to one, one gets the posterior density.

Furthermore, to keep the number of road model hypotheses manageable, one can employ capping, pruning, and/or merging processes after the update step S103. In more detail, for the merging process, all hypotheses with compatible geometry may be merged. That is, hypotheses that contain the same number of main road lanes and branch lanes, and the same type of branch lanes (on-ramp or exit-ramp— which may be determined from the angle $\phi_b$), and all lanes have the same number of segments.

Executable instructions for performing these functions are, optionally, included in a non-transitory computer-readable storage medium or other computer program product configured for execution by one or more processors.

Figure 5:
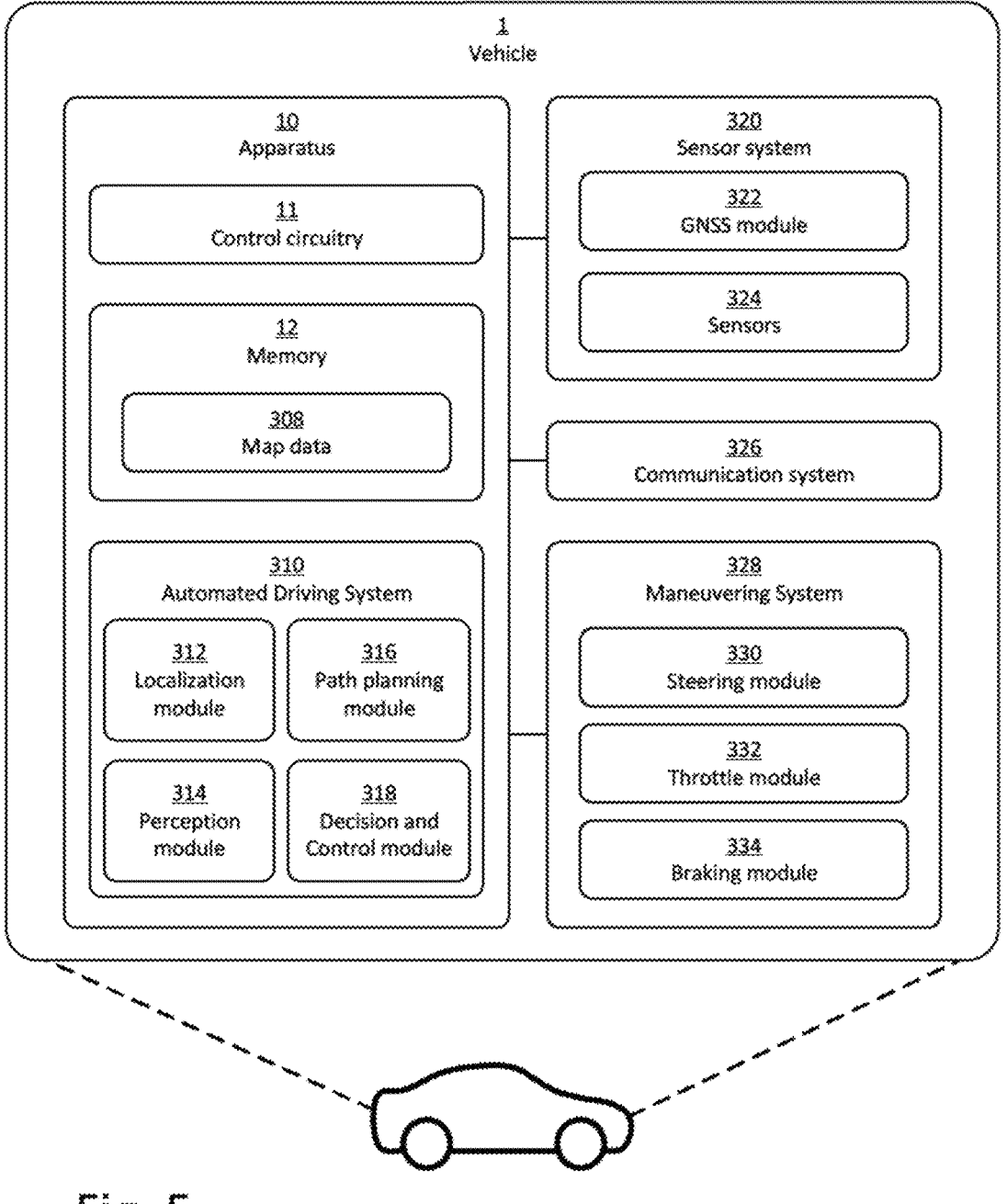
FIG. 5 is a schematic block-diagram representation of a vehicle comprising an apparatus for estimating a road geometry of a road upon which a vehicle is traveling in accordance with some embodiments.

FIG. 5 is a schematic illustration of an ADS-equipped vehicle 1 comprising an apparatus 10 for estimating a road geometry of a road upon which the vehicle 1 is traveling in accordance with some embodiments. The road geometry is described by a filter state that is tracked by a tracking filter, and the filter state comprises a plurality of road model hypotheses. Moreover, each road model hypothesis is associated with a probability and comprises a parametrization of the road describing a geometry of one or more lanes of the road and wherein each lane of each road model hypothesis is associated with a probability of existence. As used herein, a "vehicle" is any form of motorized transport. For example, the vehicle 1 may be any road vehicle such as a car (as illustrated herein), a motorcycle, a (cargo) truck, a bus, etc.

The apparatus 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g. the ADS 310). Moreover, the apparatus 10 may form a part of the ADS 310, i.e. the apparatus 10 may be implemented as a module or feature of the ADS. The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

In the illustrated example, the memory 12 further stores map data 308. The map data 308 may for instance be used by the ADS 310 of the vehicle 1 in order to perform autonomous functions of the vehicle 1. The map data 308 may comprise high-definition (HD) map data. It is contemplated that the memory 12, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 11 may be distributed e.g. such that one or more processors of the control circuitry 11 is provided as integral elements of the ADS 310 or any other system of the vehicle 1. In other words, according to an exemplary embodiment, any distributed or local control circuitry device may be utilized in the realization of the present inventive concept. The ADS 310 is configured carry out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 can have any combination of the various elements shown in FIG. 5. Moreover, the vehicle 1 may comprise further elements than those shown in FIG. 5. While the various elements are herein shown as located inside the vehicle 1, one or more of the elements can be located externally to the vehicle 1. For example, the map data may be stored in a remote server and accessed by the various components of the vehicle 1 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 5 should be seen merely as an illustrative example, as the elements of the vehicle 1 can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 1. The sensor system 320 may further comprise one or more sensors 324. The sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 1.

The vehicle 1 further comprises a communication system 326. The communication system 326 is configured to communicate with external units, such as other vehicles (i.e. via vehicle-to-vehicle (V2V) communication protocols), remote servers (e.g. cloud servers), databases or other external devices, i.e. vehicle-to-infrastructure (V2I) or vehicle-to-everything (V2X) communication protocols. The communication system 326 may communicate using one or more communication technologies. The communication system 326 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g. remote operator or control center) and/or to receive input from a remote location by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 1 further comprises a maneuvering system 320. The maneuvering system 328 is configured to control the maneuvering of the vehicle 1. The maneuvering system 328 comprises a steering module 330 configured to control the heading of the vehicle 1. The maneuvering system 328 further comprises a throttle module 332 configured to control actuation of the throttle of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e. from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g. comprised in one or more electronic control modules and/or nodes of the vehicle 1, adapted and/or configured to interpret sensory data-relevant for driving of the vehicle 1—to identify e.g. obstacles, vehicle lanes, relevant signage, appropriate navigation paths to be executed by the path planning module 316 etc. The perception module 314 may thus be adapted to rely on and obtain inputs from multiple data sources, such as automotive imaging, image processing, computer vision, and/or in-car networking, etc., in combination with sensory data e.g. from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

Accordingly, the apparatus 10 comprises control circuitry 11 configured to, for each time step out of a plurality of consecutive time steps, predict a filter state by determining a probability of each road model hypothesis based on vehicle motion data and a prior filter state determined at a preceding time step. The control circuitry 11 is further configured to associate road features obtained from perception data derived from an output of one or more vehicle-mounted sensors with the parametrization of the road of each road model hypothesis of the predicted filter state. Moreover, the control circuitry 11 is configured to determine an existence probability for each lane of each road model hypothesis based on a prior existence probability for each corresponding lane determined at the preceding time step and the road feature association. The control circuitry is further configured to determine a probability of each road model hypothesis of the plurality of road model hypotheses based on the prior filter state determined at the preceding time step and the determined existence probability of each lane of that road model hypothesis, select the road model hypothesis associated with the highest probability based on the determined probability of each road model hypothesis, and output a road model based on the parametrization of the road of the selected road model hypothesis.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a processing device, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the apparatus 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

Accordingly, it should be understood that parts of the described solution may be implemented either in the vehicle 1, in a system located external the vehicle 1, or in a combination of internal and external the vehicle; for instance, in a server in communication with the vehicle, a so called cloud solution. The different features and steps of the embodiments may be combined in other combinations than those described.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various predicting steps, associating steps, determining steps, selecting steps, adding steps, removing steps, tagging steps and outputting steps. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A computer-implemented method for estimating a road geometry of a road upon which a vehicle is traveling, the method comprising:

for each time step out of a plurality of consecutive time steps:

predicting a filter state by determining a probability density of each road model hypothesis out of a plurality of road model hypotheses comprised by the filter state based on vehicle motion data and a prior filter state determined at a preceding time step, wherein the filter state is tracked by a tracking filter and the road geometry is described by the filter state, wherein each road model hypothesis out of the plurality of road model hypotheses is associated with a probability and comprises a parametrization of the road describing a geometry of one or more lanes of the road and wherein each lane of each road model hypothesis is associated with a probability of existence;

associating road features obtained from perception data derived from an output of one or more vehicle-mounted sensors with the parametrization of the road of each road model hypothesis of the predicted filter state to establish a road feature association;

determining an existence probability for each lane of each road model hypothesis based on a prior existence probability for each corresponding lane determined at the preceding time step and the established road feature association;

determining a probability of each road model hypothesis of the plurality of road model hypotheses based on the prior filter state determined at the preceding time step and the determined existence probability of each lane of that road model hypothesis;

selecting the road model hypothesis associated with a highest probability based on the determined probability of each road model hypothesis;

outputting a road model based on the parametrization of the road of the selected road model hypothesis, wherein the road model is output to a path planning function of an automated driving system of the vehicle, the path planning function being configured to generate paths for the vehicle to execute; and controlling, via control circuitry, steering, throttle, or brakes of the vehicle to execute the paths.

2. The method according to claim 1, wherein the parametrization of the road comprises a lane center parametrization for each lane of the road and a width parametrization for each lane of the road.

3. The method according to claim 1, wherein the parametrization of the road comprises:

an ego-lane center curvature ($k_0$) of each segment of an ego-lane of a main road, a width ($\omega_{01}$) of each segment of the ego-lane, a width ($\omega_{02}$) of each segment of one or more adjacent main road lanes of the main road, and a pose ($x$, $y$, $\phi_0$) of the vehicle relative to a starting point of the ego-lane center.

4. The method according to claim 3, wherein the parametrization of the road comprises:

a classification of each lane as a main road lane or a branch lane;

a branch-lane distance ($a_1$), of each branch lane, from a starting point of a connecting main road lane center to a connection point of the branch lane to the connecting main road lane center, a branch-lane angle ($\phi_1$), of each branch lane, relative to the connecting main-road lane center at the connecting point, a branch-lane curvature ($k_1$) of each segment of the one or more branch lanes, and a branch-lane width ($\omega_1$) of each segment of the one or more branch lanes.

5. The method according to claim 1, further comprising:

for each time step out of the plurality of consecutive time steps:

adding one or more main road lanes and/or one or more branch lanes to each road model hypothesis of the predicted filter state;

removing any added main road lanes and branch lanes that have no road feature association.

6. The method according to claim 5, further comprising:

for each time step out of the plurality of consecutive time steps:

tagging the added one or more main road lanes and/or one or more branch lanes.

7. The method according to claim 1, wherein the road features obtained from perception data derived from an output of one or more vehicle-mounted sensors comprises lane marking detections obtained from a lane tracking algorithm configured to output coordinates of lane markers depicted in images output from a vehicle-mounted camera.

8. The method according to claim 1, wherein the vehicle motion data comprises a vehicle speed.

9. The method according to claim 1, further comprising:

for each time step out of the plurality of consecutive time steps:

forming the road model based on the parametrization of the road of the selected road model hypothesis by converting the road model parametrization to polylines describing lane centers of the lanes of the road.

10. A non-transitory computer-readable storage medium storing instructions which, when executed by a computing device of a vehicle, causes the computing device to carry out the method according to claim 1.

11. An apparatus for estimating a road geometry of a road upon which a vehicle is traveling, the apparatus comprising control circuitry configured to:

for each time step out of a plurality of consecutive time steps:

predict a filter state by determining a probability of each road model hypothesis out of a plurality of road model hypotheses comprised by the filter state based on vehicle motion data and a prior filter state determined at a preceding time step, wherein the filter state is tracked by a tracking filter and the road geometry is described by the filter state, wherein each road model hypothesis out of the plurality of road model hypotheses is associated with a probability and comprises a parametrization of the road describing a geometry of one or more lanes of the road and wherein each lane of each road model hypothesis is associated with a probability of existence;

associate road features obtained from perception data derived from an output of one or more vehicle-mounted sensors with the parametrization of the road of each road model hypothesis of the predicted filter state to establish a road feature association:

determine an existence probability for each lane of each road model hypothesis based on a prior existence probability for each corresponding lane determined at the preceding time step and the established road feature association;

determine a probability of each road model hypothesis of the plurality of road model hypotheses based on the prior filter state determined at the preceding time step and the determined existence probability of each lane of that road model hypothesis;

select the road model hypothesis associated with a highest probability based on the determined probability of each road model hypothesis;

output a road model based on the parametrization of the road of the selected road model hypothesis, wherein the road model is output to a path planning function of an automated driving system of the vehicle, the path planning function being configured to generate paths for the vehicle to execute; and control, via the control circuitry, steering, throttle, or brakes of the vehicle to execute the paths.

12. A vehicle comprising an apparatus according to claim 11.

\* \* \* \* \*